(12) United States Patent
Baum et al.

(10) Patent No.: US 9,578,366 B2
(45) Date of Patent: Feb. 21, 2017

(54) COMPANION DEVICE SERVICES BASED ON THE GENERATION AND DISPLAY OF VISUAL CODES ON A DISPLAY DEVICE

(75) Inventors: Kevin L. Baum, Rolling Meadow, IL (US); Stephen P. Emeott, Rolling Meadow, IL (US); Faisal Ishtiaq, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 301 days.

(21) Appl. No.: 13/463,413

(22) Filed: May 3, 2012

(65) Prior Publication Data

US 2013/0298179 A1   Nov. 7, 2013

(51) Int. Cl.
| | |
|---|---|
| G06F 3/00 | (2006.01) |
| G06F 13/00 | (2006.01) |
| H04N 5/445 | (2011.01) |
| H04N 21/41 | (2011.01) |
| H04N 21/43 | (2011.01) |

(Continued)

(52) U.S. Cl.
CPC ...... *H04N 21/4122* (2013.01); *H04N 21/4307* (2013.01); *H04N 21/4622* (2013.01); *H04N 21/4126* (2013.01); *H04N 21/41407* (2013.01); *H04N 21/4788* (2013.01); *H04N 21/8352* (2013.01)

(58) Field of Classification Search
CPC  H04N 21/2355; H04N 21/236; H04N 21/237; H04N 21/254–21/2542; H04N 21/41; H04N 21/4122
See application file for complete search history.

(56) References Cited

U.S. PATENT DOCUMENTS

| | | |
|---|---|---|
| 7,387,250 B2 | 6/2008 | Muni |
| 7,624,916 B2 | 12/2009 | Sato et al. |

(Continued)

FOREIGN PATENT DOCUMENTS

| | | |
|---|---|---|
| WO | 2009144536 A1 | 12/2009 |
| WO | 2010090946 A1 | 8/2010 |

OTHER PUBLICATIONS

Langlotz, Tobias, et al., "Unsynchronized 4D Barcodes Coding and Decoding Time-Multiplexed 2D Colorcodes", Bauhaus-University Weimar, 2007. URL: http://www.uni-weimar.de/medien/ar/Pub/U4DB.pdf.

(Continued)

*Primary Examiner* — Joshua Taylor
(74) *Attorney, Agent, or Firm* — Troutman Sanders LLP; James E. Schutz; Brennan M. Carmody (57) ABSTRACT

In one embodiment, a method includes launching an application on a first device. The application allows the first device to trigger a service based on a program being played on a second device. The first device captures a visual code being displayed in association with the program being played on the second device. The visual code includes encoded information for program ID information associated with the program being played on the second device and timing information associated with the program being played on the second device. The method determines the program ID information and the timing information from the encoded information included in the visual code and then triggers the service for the application using the timing information and the program ID information.

11 Claims, 4 Drawing Sheets

(51) Int. Cl.
*H04N 21/462* (2011.01)
*H04N 21/414* (2011.01)
*H04N 21/4788* (2011.01)
*H04N 21/8352* (2011.01)

(56) References Cited

U.S. PATENT DOCUMENTS

| | | |
|---|---|---|
| 7,942,328 B2 | 5/2011 | Snyder et al. |
| 2007/0157251 A1* | 7/2007 | Shrivastava et al. ........... 725/60 |
| 2010/0100899 A1* | 4/2010 | Bradbury ........... H04N 7/17318 725/29 |
| 2011/0000958 A1 | 1/2011 | Herzig |
| 2011/0289532 A1 | 11/2011 | Yu et al. |
| 2011/0307931 A1* | 12/2011 | Shuster ......................... 725/105 |
| 2012/0017236 A1* | 1/2012 | Stafford et al. ................. 725/32 |
| 2012/0199643 A1* | 8/2012 | Minnick et al. ............. 235/375 |

OTHER PUBLICATIONS

Olsen, Elizabeth, "Bar Codes Add Detail on Items in TV Ads", New York Times online, Sep. 26, 2010. URL: http://www.nytimes.com/2010/09/27/business/media/27bluefly.html.
Iris Uitz et al.: "Der QR-Code a aktuelle Entwicklunge und Anwendungsbereiche", Informatik-Spektrum; Organ Der Gesellschaft Fur Informatik E.V. Und Mit Ihr Assoziierter Organisationen, Springer Berlin, DE, vol. 35, No. 5, Mar. 28, 2012, all pages.
Nicolas Weil: "Synchronized Second-Screen technologies panorama", Nov. 15, 2011, retrieved from the Internet: URL:http://blog.eltrovemo.com/529/sychronized-second-screen-technologies-panorama/[retrieved on 2013-0-10, all pages.
Patent Cooperation Treaty, International Search Report and Written Opinion of the International Searching Authority for International Application No. PCT/US2013039440, Jul. 19, 2013, 12 pages.

* cited by examiner

COMPANION DEVICE SERVICES BASED ON THE GENERATION AND DISPLAY OF VISUAL CODES ON A DISPLAY DEVICE

BACKGROUND

Companion device experiences allow a user to use a companion device, such as a media capable portable device (e.g., a smartphone or tablet), simultaneously while watching a program on a main device, such as a television. For example, a user may watch a TV show on a main television screen and simultaneously chat with friends about the TV show using a tablet device, or post comments about the TV show from the tablet for others to see in real time.

To enable the companion device experience with the main device, a user may manually enter the program identifier (ID) information for the program into the companion device. However, the companion device typically does not have any knowledge of the program that is currently being displayed on the main screen. For example, the companion device assumes the user is watching the program on the main screen due to the user inputting the program ID information into the companion device, not because the companion device actually has detected the program is being displayed on the main device. Having users manually enter the program ID information may lower the participation rate because of the difficulty in determining the program ID information and the process of manually entering in the program ID information.

Some solutions may attempt to detect the audio of the program being output on the main device to determine the program ID information. However, detecting the audio is not a foolproof solution. For example, if the audio is sampled during a commercial, the volume is too low, or if there is significant background noise, the program may not be identified. Additionally, a companion device is often not powerful enough to perform the audio recognition algorithms necessary to determine the program ID information. Thus, communication with a back-end infrastructure is needed. The investment in the back-end infrastructure may be large because the infrastructure requires tuners, real-time audio analyzers, storage, and real-time database management and search functions for all possible programs that may be offered.

DETAILED DESCRIPTION

Described herein are techniques for a companion device system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

In one embodiment, a method includes launching an application on a first device. The application allows the first device to trigger a service based on a program being played on a second device. The first device captures a visual code being displayed in association with the program being played on the second device. The visual code includes encoded information for program ID information associated with the program being played on the second device and timing information associated with the program being played on the second device. The method determines the program ID information and the timing information from the encoded information included in the visual code and then triggers the service for the application using the timing information and the program ID information.

In one embodiment, a method includes determining, at a first device, an indication to display a visual code. The visual code is associated with a program being output by the first device and displayed on a display device. The method determines the visual code for display on the display device. The visual code includes encoded information for program ID information associated with the program being displayed on the display device and timing information associated with the program being output by the first device. The method then causes display of the visual code, wherein a second device is configured to capture the visual code being displayed, determine the program ID information for the program being displayed on the display device and the timing information associated with the program, and trigger a service to use the program ID information and the timing information.

In one embodiment, an apparatus is provided comprising: one or more computer processors; and a computer-readable storage medium comprising instructions for controlling the one or more computer processors to be operable for: launching an application, wherein the application triggers a service based on a program being played on a device; capturing a visual code being displayed in association with the program being played on the device, wherein the visual code includes encoded information for program ID information associated with the program being played on the device and timing information associated with the program being played on the device; determining the program ID information and the timing information from the encoded information included in the visual code; and triggering the service for the application using the timing information and the program ID information.

In one embodiment, an apparatus is provided comprising: one or more computer processors; and a computer-readable storage medium comprising instructions for controlling the one or more computer processors to be operable for: determining an indication to display a visual code, wherein the visual code is associated with a program being output and displayed on a display device; determining the visual code for display on the display device, wherein the visual code includes encoded information for program ID information associated with the program being displayed on the display device and timing information associated with the program; and causing display of the visual code, wherein a device is configured to capture the visual code being displayed, determine the program ID information for the program being displayed on the display device and the timing information associated with the program, and trigger a service to use the program ID information and the timing information.

Figure 1:
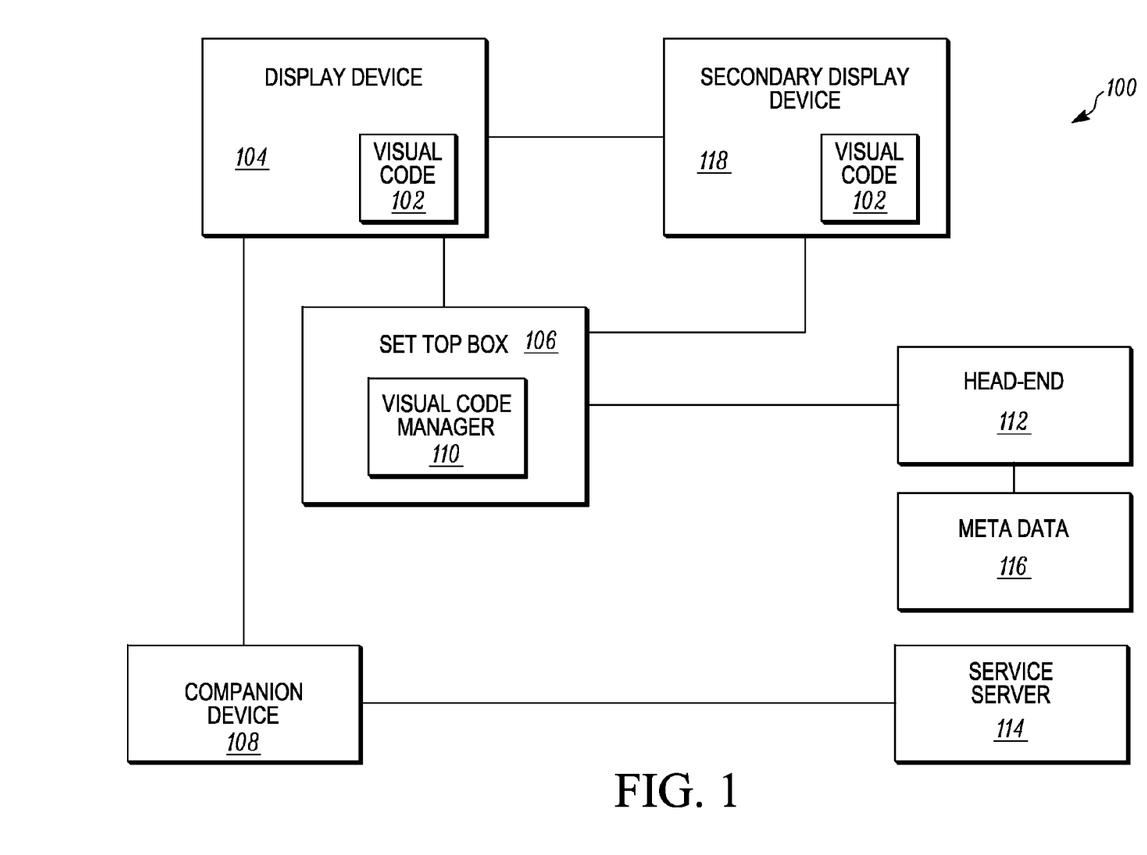
FIG. 1 depicts a simplified system for using visual codes in a companion device environment according to one embodiment.

FIG. 1 depicts a simplified system 100 for using visual codes 102 in a companion device environment according to one embodiment. A companion device environment includes a companion device 108 and a main device, referred to as a display device 104. Companion devices 108 include smartphones, tablet devices, personal media players, personal digital assistants (PDAs), laptop computers, or other portable devices. Display devices 104 include televisions, personal computers, monitors, flat panel displays, or other devices that can display a program, which may be a television show, movie, recorded program, on demand program, or any other media program including content. The companion device environment allows a user to use companion device 108 to participate in some way with a program being displayed on display device 104.

Particular embodiments may reduce the need for intensive back-end processing and leverage the proliferation of portable devices that can read visual codes 102. In one embodiment, visual code 102 is displayed on display device 104. Visual code 102 may encode information in a bar code or a quick response (QR) code. Other visual codes 102 that encode information may also be used, such as logos, artwork, or codes that are masked from detection by humans (e.g., a spreading code from code division multiplex access (CDMA) to overlay very low-intensity code over several video frames). In one embodiment, visual code 102 is a non-textual visual code. Also, visual code 102 may be separate from an original audio/video stream captured from cameras capturing the audio/video stream.

In one embodiment, a set top box 106 is configured to facilitate playing of a program. Although a set top box is described, set top box 106 may also be part of display device 104. For example, display device 104 may be a "smart" television that is capable of generating visual codes 102. In this case, functions described with respect to set top box 106 may be distributed to other entities, such as display device 104.

In another embodiment, a set top box 106 is configured to facilitate playing of a recorded program. Set top box 106 may include a Digital Video Recorder (DVR) (not shown) that records a program for later viewing. The DVR may be accessible from one or more display devices 104 or may be integrated into a "smart" television that is capable of generating visual codes 102.

Set top box 106 includes a visual code manager 110 that determines an applicable visual code 102 and displays visual code 102. Visual code 102 may be displayed on display device 104 that is playing the program or a different device, such as a separate computer monitor or a separate display panel (e.g., such as an LCD/LED panel or an electronic-ink-display panel). For example, a restaurant may display a football game on one TV and a barcode specifically for the same game on a secondary display (e.g., above or next to the game TV). Visual code manager 110 may determine program ID information for a signal that set top box 106 is currently outputting on display device 104. The program ID identifies the program either directly or indirectly and may include a title, episode number, unique program ID, a serial number, or other identifying information. Different methods for determining the program ID information may be used. For example, set top box 106 may retrieve program guide information for the program being output on display device 104. The program guide may be received from a metadata repository 116 through head-end 112 (or a separate metadata server (not shown)) for all programs and includes the program ID for the program currently being output. Also, set top box 106 may query head-end 112, which is a server that is delivering the program to set top box 106, for the program ID information.

Set top box 106 also determines timing information for the program. Timing information may be information for determining an elapsed time since the start of the program, such as time-into-program, time remaining, percentage elapsed or remaining, program start or end time and current time, program segment number, or any other type of data that supports determining what segment of the program is being output onto display device 104. Visual code manager 110 determines a visual code 102 that represents the program ID information and the timing information. The timing information (e.g., elapsed or remaining time) may either include or exclude commercial breaks: the configuration may be known in advance or may be conveyed by including an indicator in the visual code 102. As will be described below, visual code 102 may be dynamically generated by set top box 106 or another entity may generate visual code 102 and visual code manager 110 selects the (appropriately) generated visual code 102 for display.

A companion device 108 may be used to capture and decode visual code 102. For example, a user may launch an application on companion device 108 and capture visual code 102 using a capture device, such as a companion device's camera, as visual code 102 is being displayed on display device 104. Capture devices other than a camera may also be used, such as a bar code scanner, and also capture devices may be integrated with companion device 108 or be located separate from companion device 108. Companion device 108 can then decode visual code 102 to determine the program ID information and the timing information and use the decoded information to trigger services. For example, the application may be a "check-in application" where companion device 108 automatically uploads the captured program ID information and the timing information to a service server 114. Service server 114 may then check-in the user using the information. For example, a message of "User X is watching program Y and is time Z into the program" is posted in a social application. In another embodiment, service server 114 may be a companion feed server that provides a service that synchronizes the playing of the program on companion device 108 with the program being displayed on display device 104 using the timing information and program ID. These examples will be described in more detail below.

Figure 2:
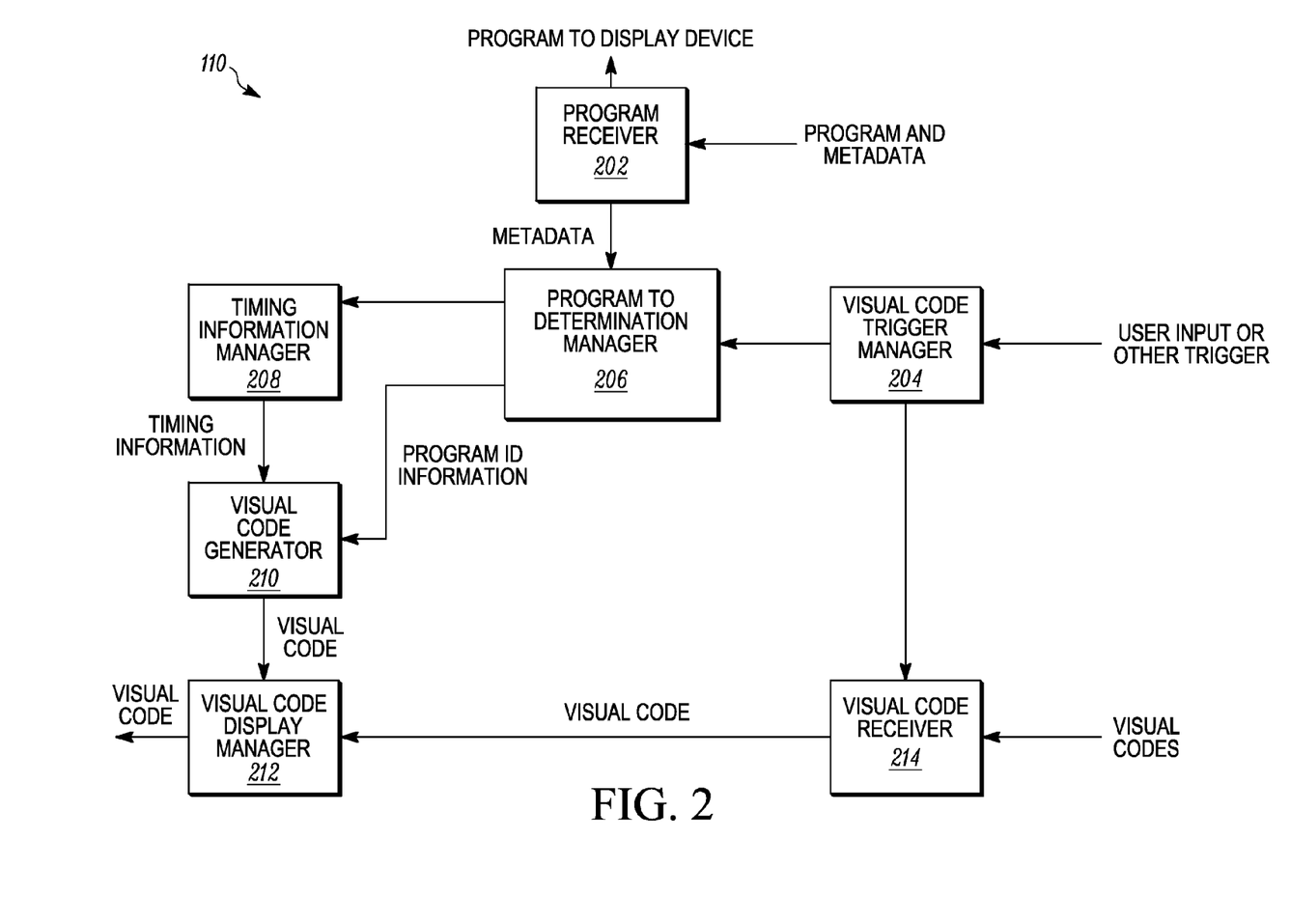
FIG. 2 depicts a more detailed example of a visual code manager of a set top box according to one embodiment.

FIG. 2 depicts a more detailed example of visual code manager 110 of set top box 106 according to one embodiment. A program receiver 202 receives a signal including the program. For example, head-end 112 may send one or more programs to set top box 106 for display. In one example, a user may select a channel, and set top box 106 displays a program being offered for that channel. Program receiver 202 also receives metadata from metadata repository 116, which may include a program guide or other information about the programs. In one example, a TV show may be received from head-end 112 at program receiver 202 and is then displayed on display device 104.

A visual code trigger manager 204 determines when to generate visual code 102. For example, set top box 106 may dynamically generate visual code 102. The dynamic generation may be triggered by a timer (e.g., every 10 seconds), by an external prompt (e.g., a user request to display a visual code 102 on display device 104), by a change in the program being viewed, or by other triggers. In another embodiment, set top box 106 may not generate visual code 102. Rather, a visual code receiver 214 receives a visual code 102 that has been generated by another entity, the process of which will be described in more detail below.

If visual code 102 is dynamically generated, visual code trigger manager 204 receives the trigger and starts the process of generating visual code 102. A program ID determination manager 206 determines the program ID information. As described above, a program guide may be used, which includes the program ID information for all the channels being supplied to set top box 106. Also, head-end 112 may be queried. Other methods of determining the program ID information may be provided, such as inspecting the signal of the program being displayed for program ID information. For example, the signal may include an embedded program ID that can be determined.

A timing information manager 208 determines the timing information. For example, timing information manager 208 knows the current elapsed time of the program being output. Additionally, timing information manager 208 can query head-end 112 for the timing information. Timing information manager 208 may determine the timing information in any format, such as the time-into-program, time remaining, percentage of the program length elapsed or remaining, etc.

A visual code generator 210 receives the timing information and the program ID information and generates visual code 102. Visual code 102 includes the information encoded in a format not readable by a human (e.g., a machine readable format). A visual code display manager 212 then displays visual code 102 on display device 104. Visual code 102 may then be displayed for a short period of time and then disappear.

As discussed above, in another embodiment, set top box 106 may not generate visual codes 102. Rather, an upstream network device in a network may be generating visual codes 102. In this case, visual code receiver 214 receives visual codes 102 from the network device. For example, a content producer that provides the program may generate visual codes 102 for the entire program. Also, a network device may generate visual codes automatically as the program is being played. Visual codes 102 may be embedded or multiplexed into a transport stream or file structure of the program that is provided to program receiver 202. Additionally, visual codes 102 may be provided in a supplemental stream that is separate from the signal that includes the program.

In one example, head-end 112 generates a visual code stream containing the program ID information and timing information for every program being broadcast (e.g., in a stream). The visual code stream is encapsulated in an encoded video stream with a separate identifier from the main program. The visual code stream may be multiplexed with the audio/video (A/V) streams of the program. Visual code receiver 214 may extract the visual code stream from the program stream. For example, when a user requests that a visual code 102 be generated, an applicable visual code 102 is extracted from the visual code stream based on a time of the request. For example, visual code receiver 214 determines a visual code 102 that corresponds in time when a request to output a visual code 102 is received. Also, based on a timer, visual code receiver 214 extracts visual codes 102 from the visual code stream at certain intervals. After determining an applicable visual code 102, visual display manager 212 displays visual code 102.

A user may record a program for later viewing, such as using a digital video recorder (DVR). Thus, a user may not be viewing a program while it is recording. In this case, visual codes 102 may be generated when the user plays the recorded show at a later time or when the program is being recorded. In one example, visual codes 102 may be generated while the show is being recorded to eliminate the need for retrieving the program ID and timing information after the show has aired, which may be more complicated than accessing a program guide for what is currently being broadcast. In this case, set top box 106 may record the program ID information and the timing information during the recording phase. This information may be stored and accessed later when the recorded program is being played back to generate visual codes 102. Also, in another example, visual codes 102 may be generated and stored as a supplemental stream during the recording phase.

Visual codes 102 may be displayed differently. For example, visual code 102 may be a full-screen code that may be displayed with a background, such as a white background, that covers the program being played. Also, visual code 102 may be part of a program ID information screen or program guide. In another example, visual code 102 may be displayed as a picture-in-a-picture. In this case, visual code 102 is displayed as a separate video stream from the program being displayed on display device 104. Visual code 102 may also be layered on top of the normal signal of the program. Visual code 102 may be made semi-transparent or a semi-transparent silk-screen may be put on top of the video, but beneath visual code 102 to improve the scanability. Visual code 102 may also be displayed on a secondary display device 118 that is related/linked to display device 104 and may be located near display device 104. For example, secondary display device 118 may be connected to the same set-top box or tuner as display device 104, or a video output port of display device 104, etc. By displaying visual code 102 on a linked secondary display device 118, the program display is not interrupted on the display device 104. Visual code 102 may be displayed on secondary display device 118 by communication with set top box 106, display device 104, or through other methods.

Figure 3:
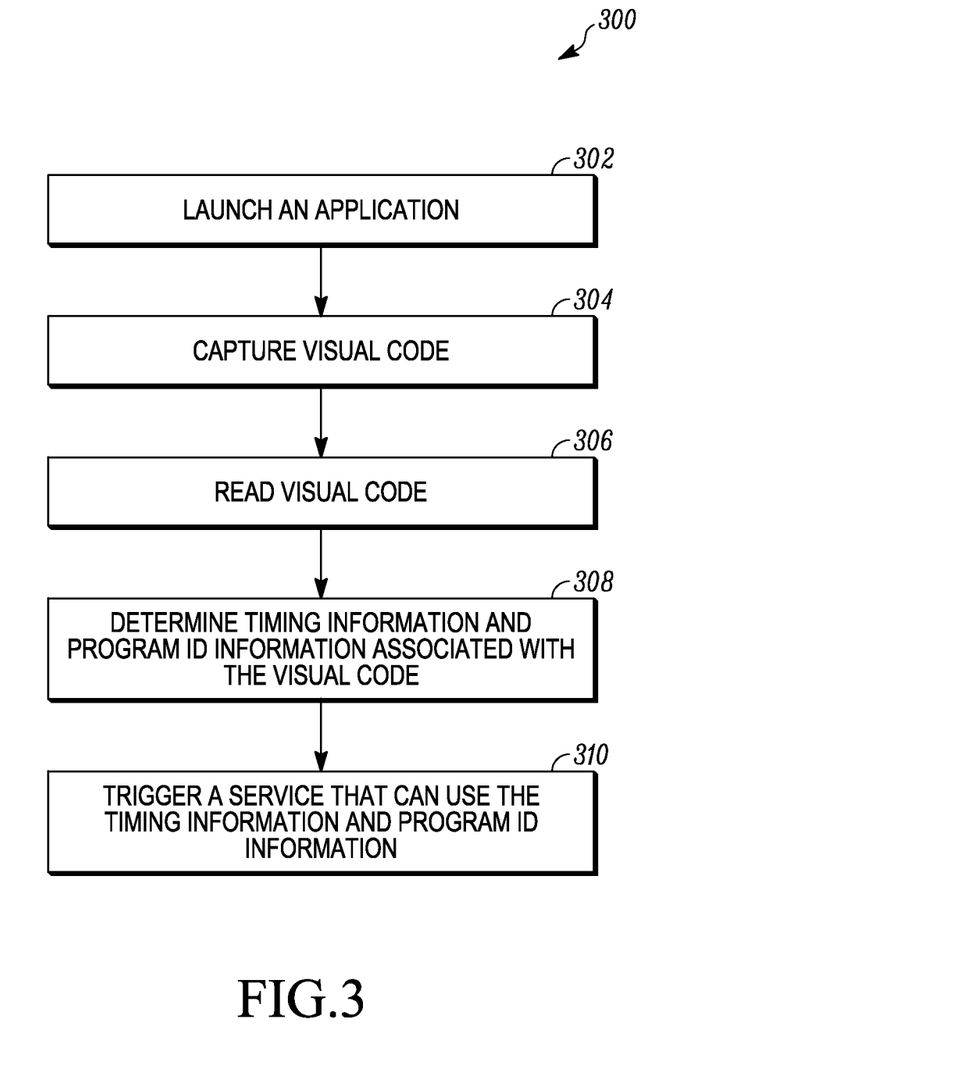
FIG. 3 depicts a simplified flowchart of a method for capturing and triggering services using a companion device according to one embodiment.

Once visual code 102 is displayed on display device 104, a user may use companion device 108 to capture visual code 102 and trigger services. FIG. 3 depicts a simplified flowchart 300 of a method for capturing and triggering services using companion device 108 according to one embodiment. At 302, companion device 108 launches an application. The application may be an application in which a service will be triggered. For example, the application is a social application that will use the timing information and the program ID information to check in a user. Also, the application may include a feature to capture visual code 102. If the application is not configured to capture visual code 102, a separate application may be used to capture visual code 102 and then the separate application sends the program ID information and the timing information to the application.

At 304, companion device 108 captures visual code 102. For example, a user may point a camera of companion device 108 at display device 104 and capture visual code 102. Additionally, an external capture device may be used to capture visual code 102 and send visual code 102 to companion device 108.

At 306, companion device 108 reads visual code 102. For example, visual code 102 may be decoded. At 308, companion device 108 determines timing information and program ID information associated with visual code 102. For example, decoding visual code 102 yields the timing information and the program ID information.

Figure 4:
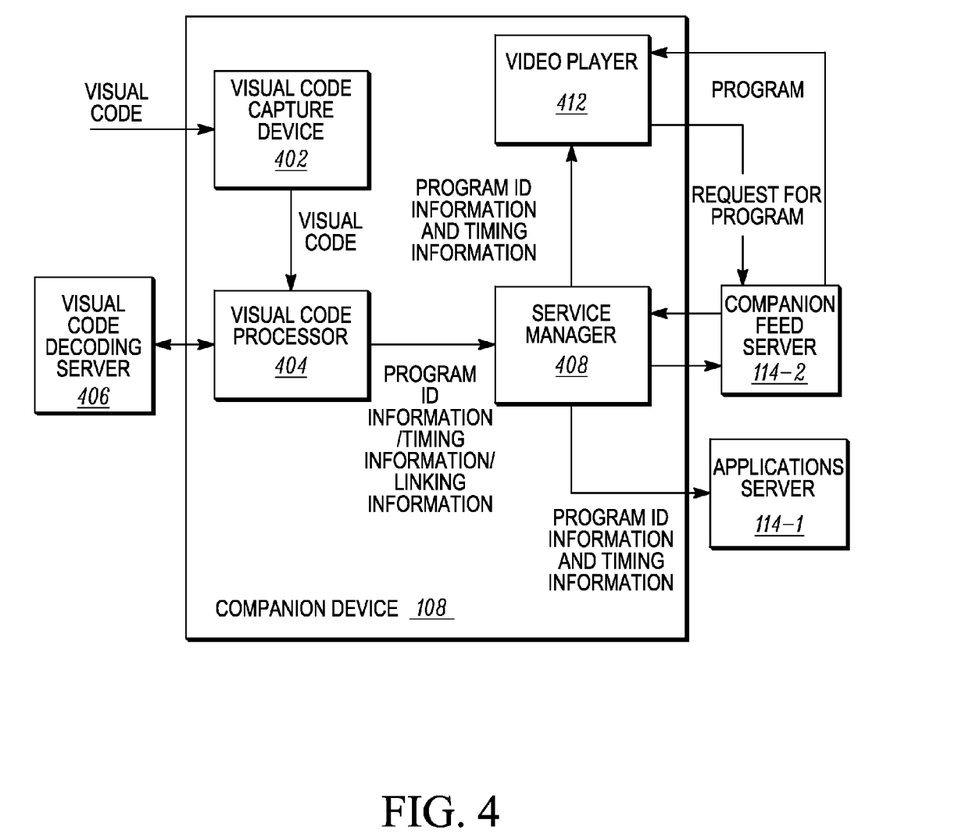
FIG. 4 depicts a more detailed embodiment of the companion device and a description of different services that can be performed according to one embodiment.

At 310, companion device 108 triggers a service that can use the timing information and the program ID information. FIG. 4 depicts a more detailed embodiment of companion device 108 and a description of different services that can be performed according to one embodiment. A visual code capture device 402 is used to capture visual code 102. Visual code capture device 402 may include a camera and associated software that is used to capture visual code 102.

A visual code processor 404 processes visual code 102 to determine the timing information and the program ID information. For example, visual code processor 404 may decode visual code 102 to determine the information. In another embodiment, a separate device may be used to determine the program ID information and timing information. For example, visual code processor 404 communicates with a visual code decoding server 406 that can decode visual code 102. Visual code processor 404 may forward visual code 102 to visual code decoding server 406, which can decode visual code 102. Visual code decoding server 406 then sends the program ID information and the timing information back to visual code processor 404.

In another embodiment, visual code 102 may contain related information about the program shown on the screen, such as links related to content associated with the program and the timing information. For example, visual code 102 may contain a uniform resource locator (URL) to secondary content related to the advertisers airing commercials during the program or URLs to past or future episodes related to events occurring in the program. The related information may be obtained by set top box 106 from the head-end 112. Companion device 108 triggers a service that can use the related information included in visual code 102.

In another embodiment, set top box 106 may not directly determine the program ID and the timing information and encode the information in visual code 102. Rather, set top box 106 may include information that allows companion device 108 to determine the program ID and the timing information. For example, set top box 106 may generate a visual code 102 that links set top box 106 to companion device 108. For example, visual code 102 may include a set top box identifier serial number. Alternatively, set top box 106 may perform a media analysis of the program being output to display device 104. For example, instead of a program ID, a text snippet or fingerprint of dialogue of the program, an audio fingerprint, or a visual fingerprint may be provided in a visual code 102. This information may be used to identify the program based on some further analysis and may be included in the visual code 102 in environments subject to a high level of noise or subject to poor lighting or visibility where the companion device 108 may be unable to collect high quality information for media analysis without receiving the media analysis information from the set top box 106. For example, a compact fingerprint representation of a snippet of dialogue received in the media analysis information is compared to a database of dialogue for multiple programs. A program that includes the same dialogue is then determined In one embodiment, visual code processor 404 then forwards visual code 102 to visual code decoding server 406. However, in other embodiments, companion device 108 may perform the processing described. Visual code decoding server 406 may determine the program ID information and the timing information based on the information encoded in visual code 102. For example, if the set top box ID is encoded in visual code 102, visual code decoding server 406 determines what set top box 106 is currently outputting. For example, visual code decoding server 406 may communicate with or be part of head-end 112 and can monitor the current status of set top box 106 based on the set top box ID.

If a media analysis is included in visual code 102, then visual code decoding server 406 may correlate the information with a media database of programs to determine a program that matches the media analysis. For example, the audio fingerprint is matched with an audio fingerprint of a program at a certain time in the program. This yields the program ID information for the program and the timing information in the program. Visual code decoding server 406 may then send the program ID information and timing information to visual code processor 404. In another embodiment, visual code decoding server 406 may automatically trigger the service for companion device 108.

As described above, one service may be a check-in service. In this case, a service manager 408 contacts an applications server 114-1 to have the service performed. For example, applications server 114-1 checks the user in using a social application.

In another embodiment, a bookmark service is offered. When a user sees something interesting during a program being watched, the user may want to bookmark this time for later reference. For example, the user may bookmark a funny scene in a sitcom or an interview during a news program. The user may select an input on a remote control to cause a visual code 102 to be generated. Set top box 106 then generates visual code 102 with the program ID information and the timing information. Companion device 108 is used to scan visual code 102 and then a bookmark is created. For example, the program and time of the bookmark is saved and the user can later use the bookmark to replay the program at that time.

In another embodiment, automatic playback of the program on companion device 108 may be performed based on visual code 102. For example, whatever program is currently being output on display device 104 can then be played on companion device 108 starting at a similar point in time. In this case, set top box 106 may include linking information to the program. In one embodiment, the linking information serves as the only program ID information, while in another embodiment, the program ID information is provided in multiple forms that allow a program to be identified, one of which is the linking information. The linking information allows companion device 108 to initiate playback of the program. In one embodiment, the playback of the program on companion device 108 may require a different version of the program. For example, set top box 106 uses a digital cable format and companion device 108 uses a streaming version. In one example, the linking information may include a uniform resource locator (URL) for a different version of the program. Then, a hypertext transfer protocol (HTTP) adapted streaming technology may be used, e.g., HTTP live streaming (HLS), motion picture experts group (MPEG) DASH, or third-generation partnership project (3GPP) DASH. The linking information may refer to a streaming playlist for the same program that may be available from a companion feed server 114-2. Companion feed server 114-2 may be different from head-end 112. For example, companion feed server 114-2 may be found in a content provider's network and stream content through the Internet rather than a cable network.

The application of companion device 108 may provide an option to automatically start playing what is being output on display device 104 on companion device 108. In this case, a service manager 408 may launch a video player 412 based on the linking information and the timing information from visual code 102. Video player 412 may then determine the playlist for the program using the linking information and the timing information to facilitate playback at an elapsed time for the program. For example, a playlist may refer to media chunks of the program and there may be no notion of a "current time". In this case, video player 412 determines how many media chunks to skip over in the playlist based on the timing information. For example, if the timing information corresponds to N media chunks, then video player 412 skips the first N media chunks and begins download/playback at media chuck N+1. In this case, video player 412 may request media chunk N+1 from server 114-2. Video player 412 then can continually request subsequent media chunks from server 114-2. In other embodiments, the timing information may also be provided as a byte-offset into a media file including the entire program.

In another embodiment, if a live program is being offered, such as a live broadcast of a newscast, the timing information may not be used. This is because the playlist for a live program "slides" in sync with the live broadcast (with a modest fixed delay) thus allowing the playback to start approximately in sync with the broadcast being output on display device 104. Thus, the linking information may be used to request the live broadcast from server 114-2 and playback starts approximately when visual code 102 was captured.

In another embodiment, server 114-2 may create a sliding window playlist even for non-live content that converts a program into a live program from the perspective of video player 412. In another embodiment, server 114-2 may publish a non-live playlist URL, but deletes chunks from the beginning of the playlist as the program progresses. For example, the first chunk in the playlist always corresponds to a current time into the program on display device 104. This forces the playback to start roughly in sync with what is being displayed on display device 104.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   launching an application on a first device, wherein the application allows the first device to trigger a service based on a program being played on a second device;
   causing the second device to, in response to user input entered at the first device while the program is being played on the second device, generate a visual code associated with the program being played on the second device and display the visual code;
   capturing, at the first device, the visual code being displayed by the second device, wherein the visual code includes encoded information for determining program ID information associated with the program being played on the second device and timing information associated with the program being played on the second device, and wherein the visual code is configured at least in part for creating a bookmark for a media segment of the program;
   determining the program ID information and the timing information from the encoded information included in the captured visual code; and
   triggering the service for the application using the determined timing information and the determined program ID information, wherein the service comprises creating the bookmark based at least in part on the determined timing information and the determined program ID information.

2. The method of claim 1, wherein triggering the service comprises sending the determined timing information and the determined program ID information to a server that is configured to provide the service.

3. The method of claim 1, wherein:
   the determined program ID information is for a different version of the program being played on the second device, and
   triggering the service comprises sending a request for the different version of the program using the program ID information.

4. The method of claim 3, further comprising:
   using the determined timing information to determine a media segment corresponding to the determined timing information for the different version of the program;
   requesting the media segment using the determined program ID information;
   receiving the media segment; and
   playing the media segment at the first device.

5. The method of claim 3, further comprising:
   requesting the different version of the program using the determined program ID information;
   receiving a media segment, wherein the media segment is currently being delivered by a live version of the program being played on the second device; and
   playing the media segment at the first device.

6. The method of claim 1, wherein the determining the program ID information and the timing information comprises:
   sending the visual code to a decoding server for decoding of the encoded information; and
   receiving the program ID information for the program and the timing information from the decoding server.

7. The method of claim 1, wherein the determining the program ID information and the timing information comprises:
   sending the visual code to a decoding server for decoding of the encoded information, wherein the decoding server determines the program ID information associated with the program and the timing information associated with the program and triggers the service on behalf of the first device.

8. The method of claim 1, wherein the triggering the service comprises storing the bookmark to allow playback of the program using the determined timing information using the bookmark.

9. An apparatus comprising:
one or more computer processors; and
a non-transitory computer-readable storage medium comprising instructions for controlling the one or more computer processors to be operable for:
  launching, on a first device, an application, wherein the application triggers a service based on a program being played on a second device;
  causing the second device to, in response to user input entered at the first device while the program is being played on the second device, generate a visual code associated with the program being played on the second device and display the visual code;
  capturing, at the first device, the visual code being displayed by the second device, wherein the visual code includes encoded information for program ID information associated with the program being played on the second device and timing information associated with the program being played on the second device, and wherein the visual code is configured at least in part for creating a bookmark for a media segment of the program;
  determining the program ID information and the timing information from the encoded information included in the captured visual code; and
  triggering the service for the application using the determined timing information and the determined program ID information, wherein the service comprises creating the bookmark based at least in part on the determined timing information and the determined program ID information.

10. The apparatus of claim 9, wherein triggering the service comprises sending the determined timing information and the determined program ID information to a server that is configured to provide the service.

11. The apparatus of claim 9, wherein:
the determined program ID information is for a different version of the program being played on the second device, and
triggering the service comprises sending a request for the different version of the program using the determined program ID information.

* * * * *